United States Patent
Hatalsky et al.

[11] Patent Number: 5,806,791
[45] Date of Patent: Sep. 15, 1998

[54] MISSILE JET VANE CONTROL SYSTEM AND METHOD

[75] Inventors: William M. Hatalsky; Andrew B. Facciano; Stephen D. Haight, all of Tucson, Ariz.; Sean A. Johnson, Fairfield, Calif.; Aszetta D. Jordan, Cincinnati, Ohio

[73] Assignee: Raytheon Company, Los Angeles, Calif.

[21] Appl. No.: 452,211

[22] Filed: May 26, 1995

[51] Int. Cl.⁶ .............................. F42B 10/00; F02K 1/00
[52] U.S. Cl. .................. 244/3.24; 244/3.25; 244/3.3; 60/230
[58] Field of Search .................. 244/3.23, 3.24, 244/3.25, 3.26, 3.27, 3.28, 3.29, 3.3, 52; 60/230; 239/265.19

[56] References Cited

U.S. PATENT DOCUMENTS

| | | | |
|---|---|---|---|
| 2,654,552 | 10/1953 | Jonas | 244/52 |
| 4,063,685 | 12/1977 | Jacobs | 244/52 |
| 4,364,530 | 12/1982 | Ripley-Lotee et al. | 60/230 |
| 4,561,357 | 12/1985 | Maudal et al. | 244/3.3 |
| 4,844,380 | 7/1989 | Peoples et al. | 244/3.24 |
| 4,913,379 | 4/1990 | Kubota et al. | 60/230 |
| 5,511,745 | 4/1996 | Faupell et al. | 60/230 |

FOREIGN PATENT DOCUMENTS

| | | | |
|---|---|---|---|
| 520064 | 6/1953 | Belgium | 244/3.23 |
| 3138869 | 4/1983 | Germany | 244/3.3 |
| 8201745 | 5/1982 | WIPO | 244/3.3 |

*Primary Examiner*—Charles T. Jordan
*Assistant Examiner*—Theresa M. Wesson
*Attorney, Agent, or Firm*—David W. Collins; Leonard A. Alkov; Glenn H. Lenzen, Jr.

[57] ABSTRACT

A jet vane control system and method for a missile in which the system is compact, rugged, lightweight and detachably connected to the aft end of a missile. The system provides for very quick pitch over and roll control during launch. The system then detaches from the missile so as not to burden the missile during its flight to target. The vanes of the system are divided into quadrants, each having its own, mounting support and gear train assembly. Each vane is also connected through a, detachable coupling to the steering control system of the missile such that actuation of the steering control system simultaneously actuates the jet vane control system.

10 Claims, 5 Drawing Sheets

# 5,806,791

MISSILE JET VANE CONTROL SYSTEM AND METHOD

BACKGROUND OF THE INVENTION

1. Field of the Invention

The present invention relates to a missile control system and more particularly to a detachable jet vane control system placed at the aft portion of a missile and used during launch to cause the missile to pitch over rapidly while maintaining roll stability.

2. Description of the Related Art

Offensive missiles such as any number of cruise missiles are constructed to fly at low altitudes, just above treetops or water surfaces, to avoid detection by enemy radar. In such situations a targeted ship, for example, may have just a few seconds to first identify the threat and then take countermeasures such as firing one of its defensive missiles. Normally, a land or ship borne defensive missile is launched from a canister or missile launcher in a generally vertical direction, and it must first achieve sufficient velocity before its airfoil surfaces are able to effect any substantial maneuvers. This generally translates into having the missile reach an altitude of thousands of feet before it is able to pitch over and begin seeking the incoming missile threat. The time needed for these maneuvers is considered much too long.

A number of systems have been developed in an attempt to address this problem. Some of these concepts may be categorized as jet tabs, moveable nozzles, liquid injections and jet vane systems. However, devices using these systems are generally inadequate for many current applications. Retractable jet vanes, for example, are incompatible with the need for folding missile tail control surfaces, a necessary requirement for any launch canister loaded missile with stringent volume constraints.

Detachable jet tab systems comprising auxiliary propulsion units pivotally attached to the missile fins for coupled bi-directional motion similarly conflicts with folding control surfaces and require increases in the launch canister cross-section for additional volume external to the missile fuselage structure. A system of this sort is shown in U.S. Pat. No. 4,844,380.

Moveable nozzle systems are heavy and complicated and are not detachable. Liquid injection systems do not provide sufficient thrust vector angles.

Existing jet vane mechanisms are either nondetachable or incorporate actuation systems with feedback control electronics redundant to the missile's steering control unit. Nondetachable jet vane mechanisms limit missile range and performance with rocket thrust degradation throughout the missile's trajectory. Self actuation jet vane mechanisms are also heavy and inherently complicated, hence, require more rocket propellant for missile launch and lack sufficient reliability.

A shipboard defense system made by Raytheon and used on the Canadian Sea Sparrow system has vanes in the missile exhaust plume. However, this system includes elements that are redundant to those found on the missile which adds unnecessary weight, is overly complicated and is very costly.

The numerous prior attempts to provide missile control at launch has yet to produce an optimal system.

Hence, there is a need in the art for further improvements in systems and techniques for providing missile control during launch.

SUMMARY OF THE INVENTION

The need in the art is addressed by the present invention which provides a detachable missile attitude control system for use on a missile having control fins and a drive mechanism for actuating the control fins comprising a housing adapted to be attached to the aft portion of a missile; a plurality of vanes connected to the housing adapted to be positioned in the plume of the missile; and a connecting mechanism coupling the vanes to the drive mechanism for simultaneous actuation of the vanes with actuation of the control fins.

The invention provides a method for steering the missile during launch comprising the steps of placing movable vanes mounted to a housing in the plume path of a missile, connecting the housing to the aft portion of the missile, detachably connecting the housing to the aft portion of the missile and connecting the vanes to the missile's steering control system whereby the steering control system is able to move the vanes during launch of the missile.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
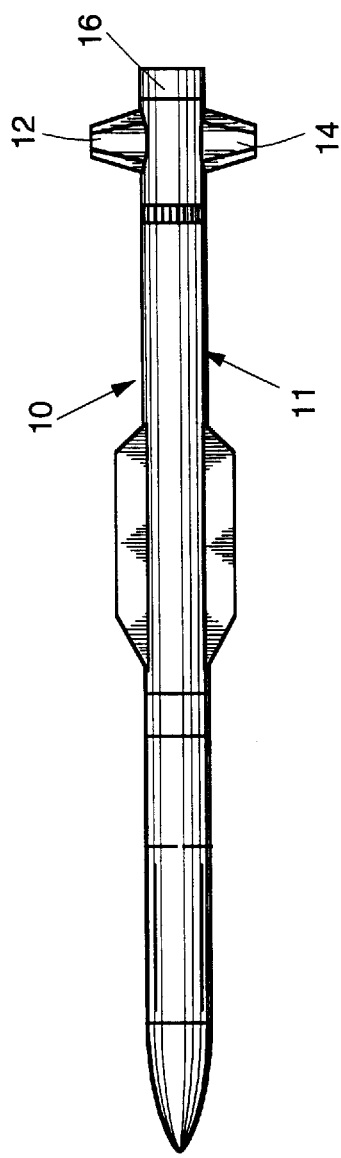
FIG. 1 is an elevation view of a missile showing the jet vane control system of the present invention mounted to the aft portion thereof.
Figure 2:
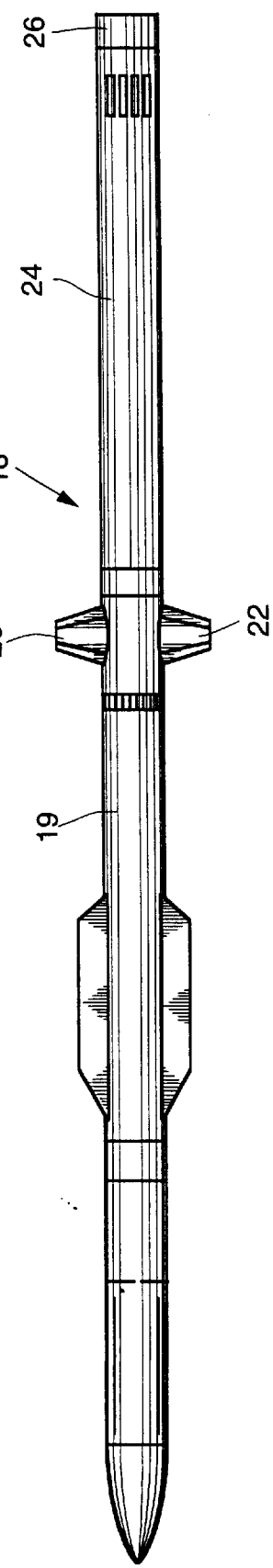
FIG. 2 is an elevation view of a missile having a booster to which is attached the jet vane control system of the present invention.

Referring to FIG. 1, there is illustrated a missile 10 having a body 11, tail fins 12 and 14 and a jet vane control system 16 detachably coupled to the aft end thereof. FIG. 2 illustrates a modified version of the missile of FIG. 1 and includes a missile 18 having a body 19, tail fins 20 and 22, a booster 24 and a detachable jet vane control system 26.

It can be appreciated from FIGS. 1 and 2 that the inventive jet vane missile control system is constructed to be retrofitted to existing missiles such as the Sea Sparrow of FIG. 1, or the system may be made part of a new missile system.

The primary purpose of the jet vane control system is to cause missile pitch over very shortly after launch, i.e. while the missile has low velocity, and eliminate roll instability.

Defensive missiles have steering control systems which control external airfoils to guide the missile. However, such a system does not work well until the missile has achieved sufficient velocity causing enough air to flow over the airfoils of the missile. The objective of the jet vane control system is to put a mechanism in the exhaust plume of the missile engine for control purposes. In this way, control can be exercised immediately upon launch. The aim is to have the missile pitch over during launch and avoid rolling which would interfere with the missile guidance system. Another feature of the jet vane control system is the use of the missile steering and drive systems to operate the jet vanes during the missile launch phase and then to detach itself from the missile. This allows the advantage of a quick pitch over to occur without the penalty of added weight, complicated structure and expensive redundant components. In addition, by making the mechanism detachable there will not be continuing drag on the missile's plume and no weight penalty on the missile during the later stages of its flight to target.

Figure 3:
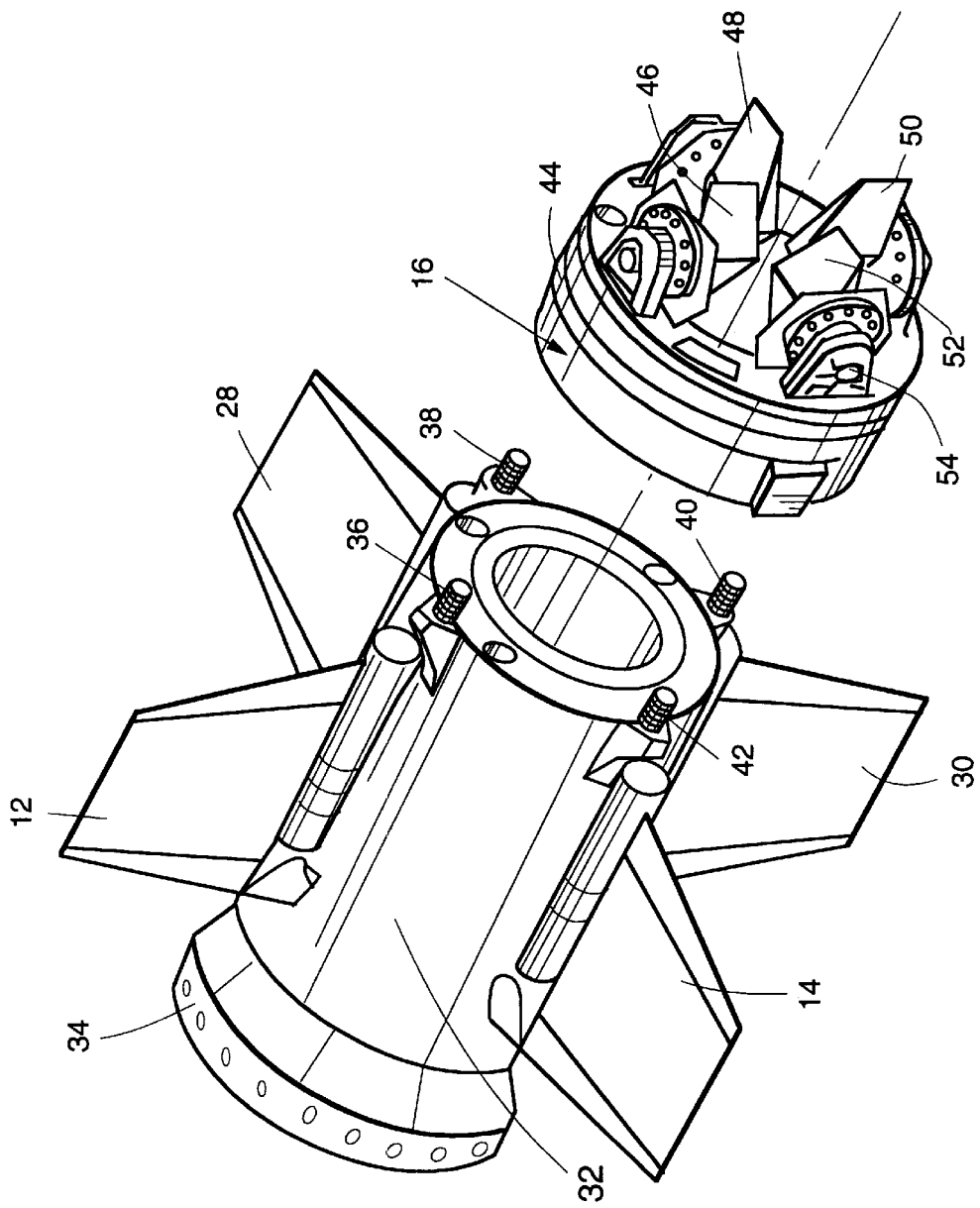
FIG. 3 is an enlarged perspective view, partially exploded and exposed showing the aft portion of the missile of FIG. 1 and a portion of the inventive jet vane control system.

To better appreciate the relative simplicity of the design of the jet vane missile control system, reference is made to FIG. 3 which shows the aft portion of the missile of FIG. 1 including its tail fins 12, 14, as well as tail fins 28 and 30. Within the body 32 of the missile are power, guidance, steering and drive systems used to rotate each of the tail fins 12, 14, 28, 30 during flight for maneuvering the missile to its preselected target.

At the forward end of the aft portion of the missile is a radial screwed joint 34 for attaching the tail fins and steering control system to the forward portion of the missile. At the opposite end of the aft portion are four explosive bolts 36, 38, 40 and 42 used to attach the jet vane control system 16 to the missile. In order to reduce drag on the missile as well as to reduce weight, the jet vane control system 16 may be detached using the explosive bolts 36, 38, 40, 42 after the missile has completed its launch phase. It is to be understood that other detachment devices such as a V-clamp (not shown) may be used as a detachable connector if desired.

The jet vane control system comprises a housing 44, a plurality of vanes such as the vanes 46, 48, 50 and 52 and connecting mechanism coupling the vanes to the drive system of the missile so that there is simultaneous actuation of the vanes and the control fins of the missile. The connecting mechanism includes the mounting structure 54 and a gear train which will be described in detail in relation to FIGS. 5 and 6. It can easily be seen however that the vanes and associated moving mechanisms are spaced 90 degrees apart. In actual use, the housing 44 extends aft to circumferentially surround the vanes and the mounting structure, but for clarity a portion has been removed.

Figure 4:
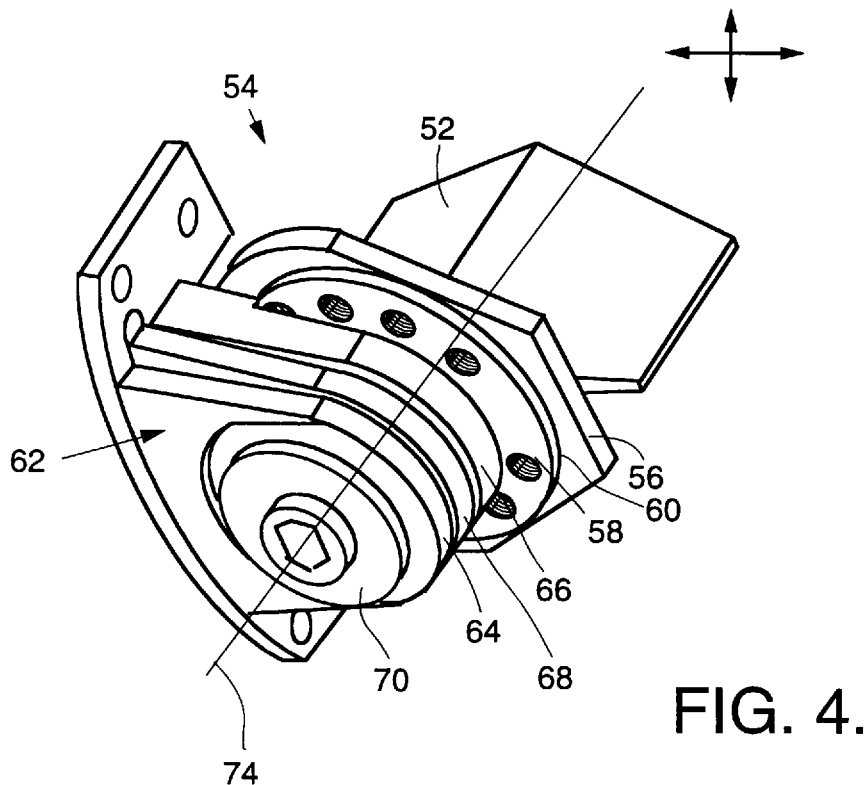
FIG. 4 is an enlarged perspective view of a portion of FIG. 3 showing a jet vane and its mounting.

Referring now to FIG. 4, the mounting structure 54 is described in more detail. The vane 52 is made integral with a shield plate 56 that in turn is connected to a vane shaft 58 separated from the plate by an insulator 60. These are all mounted to a journal block 62 having two trunnion supports 64 and 66. Between the trunnions is a bevel sector gear 68, several thrust bearings, thrust races, a belleville spring and a radial bearing. All of these are off-the-shelf items and thus are not shown. Keeping all of these in place is a vane screw 70.

The vane 52 may be of carbon/carbon, the insulator of glass/phenolic and the other materials of aluminum. The carbon/carbon jet vanes are externally bolted to their respective vane shafts with ten A286 CRES inserts and screws. The vanes and shafts are then assembled to their respective journal blocks with belleville spring washers, bevel sector gears and standard industry thrust and radial needle bearings. The carbon/carbon jet vanes are to be fabricated from 3-D carbon fiber reinforced carbon matrix composites derived from chemical vapor infiltration/deposition processes, current commercial technologies utilized to produce break pads for airliner landing gears. The vanes are also coated with a protective ceramic or refractory metal layer for erosion and oxidation protection. The vane shafts and bevel gears are to be fabricated from case hardened high strength 13-8 PH CRES. The journal blocks are to be machined from 2219 aluminum alloy and have external surfaces coated with an ablative, epoxy filled resin.

The thrust and radial bearings are utilized to transmit large vane shear and bending loads to the journal block while simultaneously allowing the vane shafts to rotate freely, mitigating the possibility of jet vane sticking or binding.

The journal block 62 has inherent structural strength and rigidity from the "dual pillow block" configuration to evenly distribute vane loads for robust operation. Placement of the bevel sector gear 68 at the inertial neutral axis of the journal block limits radial and translational strain movement, enabling consistent jet vane torque transfer and bevel tooth engagement with the gear train assembly.

One of the major advantages of the jet vane control system described here is that the jet vane system is coupled to the drive of the steering control system of the missile, using its power supply and controls and thereby avoiding the expense, complexity and weight of a duplicate system located within the jet vane control system.

The inventive system uses one control setup, one set of software, one set of electronics, one set of actuator motors and one set of batteries to operate the missile's airfoils as well as the jet vane control system. Because of the jet vane system, the steering control system of the missile has a dual function, control of the missile during its flight, and also control at launch. Without the jet vane system, the steering control capability of the missile does not express itself at launch. Complete control during all segments of missile flight is achieved, from launch, through flight, to terminal maneuver.

The jet vane control system is divided into four independent axial quadrants, each quadrant housing a jet vane, its mounting structure and its related gear train assembly. They are all assembled into an annulus load carrying ring structure covered by an external skin. The rocket plume exits through a nozzle extension cone created by the annulus ring structure and impinges upon the jet vanes located in the propellant stream before exiting the control system. It is understood that while the system is divided into 4 quadrants here, three vanes and related hardware could also be used.

Figure 5:
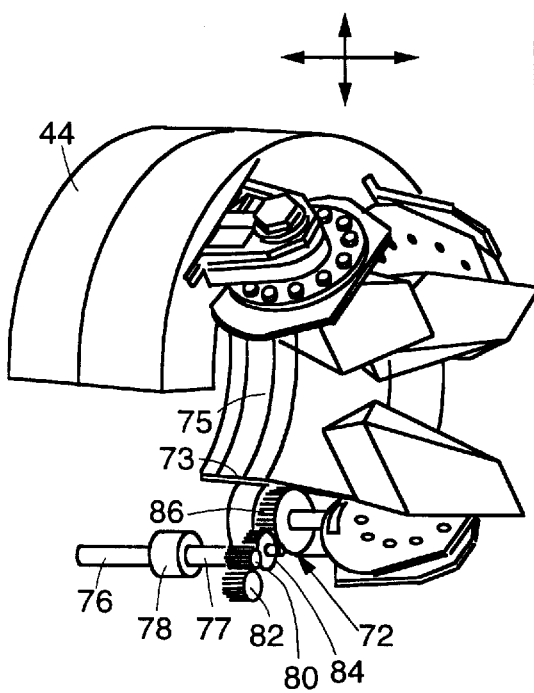
FIG. 5 is an enlarged perspective view partially broken away and partially in schematic of a portion of FIG. 3 illustrating the jet vane control system and a power takeoff assembly from the missile's steering control system.
Figure 6:
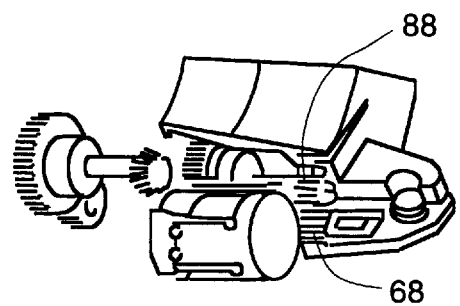
FIG. 6 is a perspective view partially broken away showing a portion of a gear train assembly of the jet vane control system.
Figure 7:
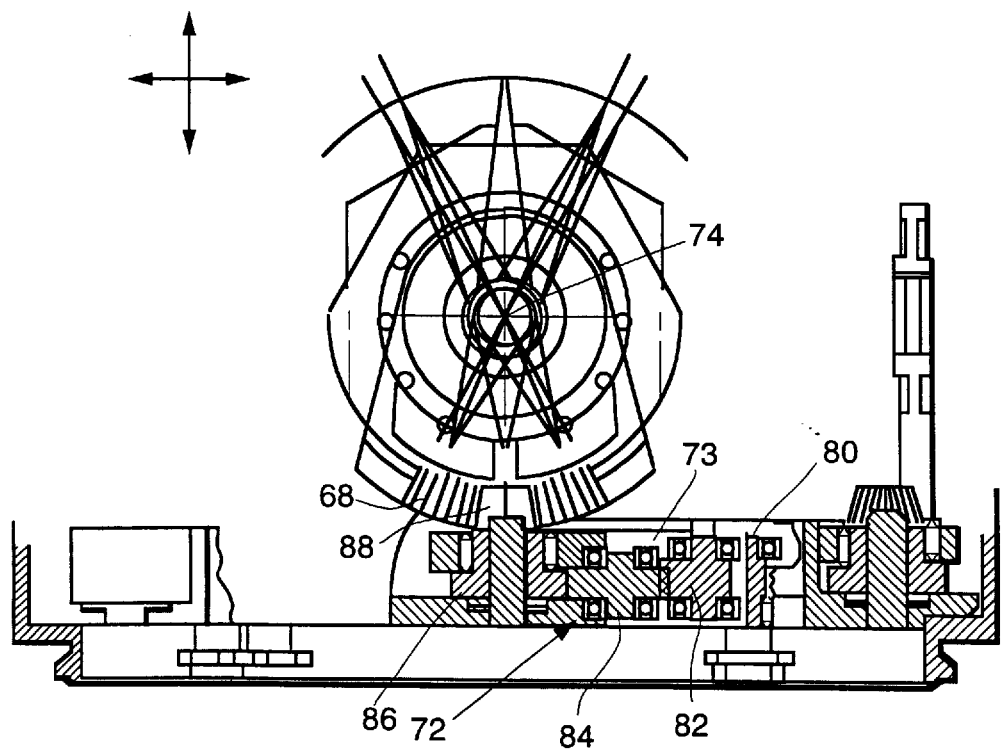
FIG. 7 is an elevational section showing the gear train assembly and the rotatable vane.

Referring to FIGS. 5, 6 and 7, a portion of a gear train assembly 72 mounted in a load carrying support structure 73 is illustrated. The support structure and a cover 75 encloses the gear train to protect it from heat, stress and strain. The gear train assembly, which is a torque transmitting apparatus, in turn causes the vane to rotate plus/minus 25 degrees (up to a maximum of 33.5 degrees) along an axis defined by the reference line or point 74 in FIGS. 4 and 7.

The gear train assembly includes a pinion 80 engaging the first of two idler gears 82 and 84 which in turn are engaged to rotate a torque transfer gear 86. The torque transfer gear is connected to a bevel gear 88 which in turn engages the sector gear 68. Each quadrant includes an identical gear train assembly. The support structure 73 is machined from 2219 aluminum alloy. The pinion 80, the two idler gears 82, 84 and the torque transfer gear 86 are fabricated from 13-8 PH CRES having a Melonite process surface treatment.

The housing ring structure and mounting structure completely encases the gear train and protects it. Gear train bearings are used and are standard off-the-shelf items. A conical glass-phenolic insert 75 is bonded inside the ring structure for thermal insulation from the rocket plume.

A detachable connecting mechanism between the gear train assembly and the drive of the steering control system is sometimes referred to as the power take off assembly and includes a shaft 77 to which is mounted the pinion 80 of the gear train. The pinion shaft 77 in turn is connected through a coupling 78 to another shaft 76 which meshes with the gears of the missile's drive system.

The coupling includes a circular adapter plate with four elliptical slots allowing for shaft offset upon jet vane control system integration with the missile while insuring decoupling ease as the jet vane system is jettisoned. This system, often called a Cardian Coupling, easily transfers torsional loads from pins to slots.

Figure 8:
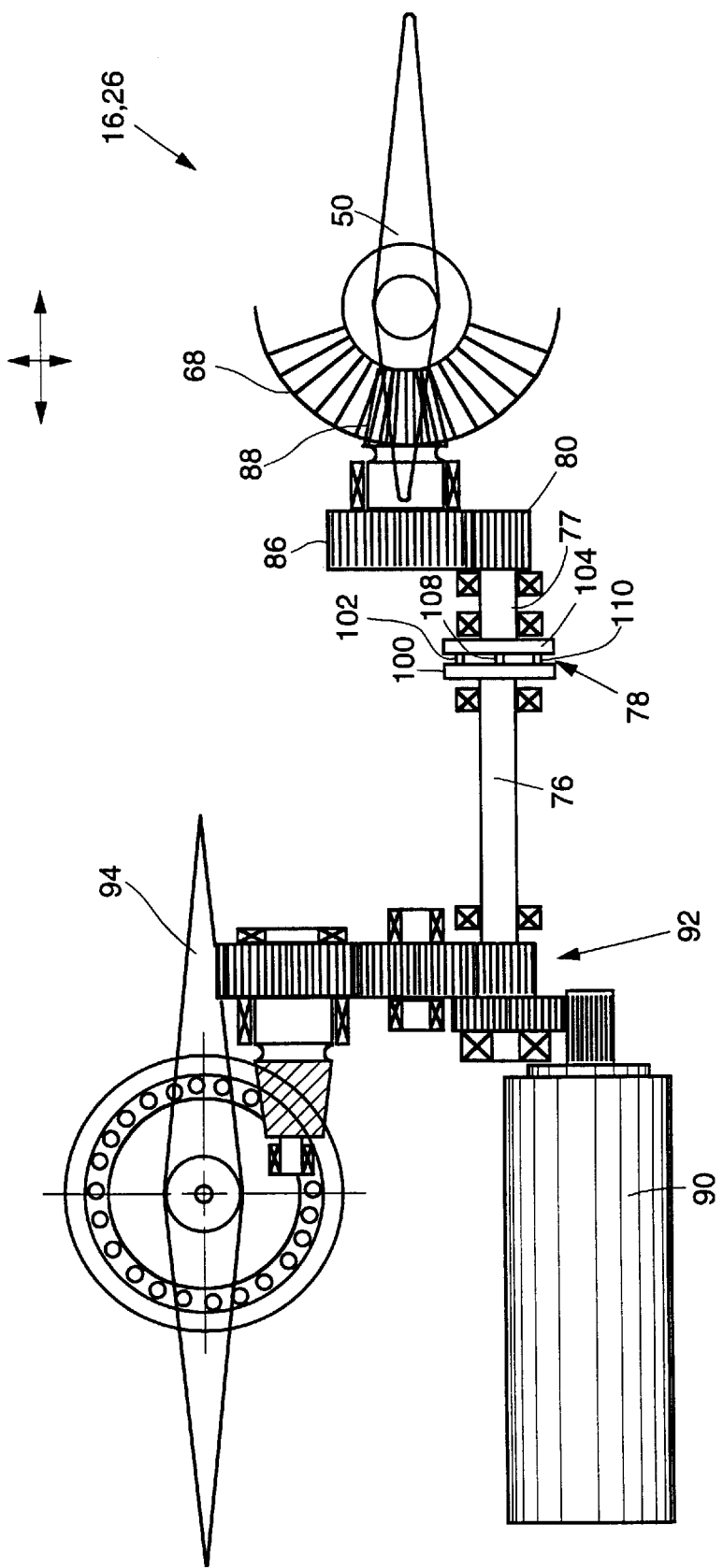
FIG. 8 is an elevational schematic of the missile's steering control system, the power takeoff assembly and the gear train assembly of the jet vane control system shown in FIGS. 5 and 6.

The simplicity, ruggedness and relative cost of the jet vane control system is schematically shown in FIG. 8. There the steering control system of the missile is shown to comprise an actuating element such as a motor 90, as well as a drive mechanism such as gear train 92 and a rotatable tail fin 94 identical to the tail fins already described in FIG. 1 such as the tail fins 12 and 14. Also located in the missile body is a guidance system 91 and a power supply such as a battery 93. As mentioned, the steering control system is already a part of the missile and is used to control the tail fins to direct the missile to its target. The problem as mentioned earlier is that in anti-missile defense, the incoming offensive missile may be at a very low altitude to avoid detection. Many defensive missiles on shipboard, however, are launched in a vertical or generally vertical direction and it is imperative that the defensive missile be maneuvered downwardly to allow an intercept at as great a distance as possible from the ship. The tail fins of a missile, however, do not provide sufficient directional force at launch because in these first few seconds the missile is not moving fast enough to provide the needed aerodynamic load on the tail fins. But, by placing vanes in the plume of the missile, sufficient thrust vector control is achieved at launch to cause the missile to quickly pitch over during the launch phase.

Using the power source already available on the missile to guide the jet vane control system has been accomplished directly and simply by the power takeoff assembly which includes the shaft 76, disposed generally parallel to the missile's longitudinal axis. At the aft end of the power takeoff shaft is the coupling 78 having a driver plate 100 and attached torque pins 102, a driven plate 104 and attached torque pins such as pin 108, and an adapter plate 110. The pins of the driver and driven plates are received by recesses in the adapter plate 110. The recesses are oversized to allow easy engagement with the pins so as to transmit torque, but disengagement in an axial direction is also extremely easy when the jet vane control system is separated from the missile after the launch phase.

The driven plate 104 is attached to the shaft 77 on which the pinion 80 of the gear train is mounted. This arrangement allows the shaft 76 to transmit torque to the shaft 77, allows for misalignment between the shafts 76 and 77 and also allows easy decoupling. The mechanical arrangement is extremely simple, rugged and effective as a coupling mechanism.

Each gear train assembly receives power directly from the missile's steering control system by a respective power takeoff assembly. A power takeoff assembly couples each of four steering control system portions of the missile to a vane of the jet vane control system located within the same axial quadrant. The steering control system of the missile drives the tail fins and the coupled jet vanes simultaneously.

The jet vane control system may be mechanically attached to the aft end of the missile structure by a V-clamp. The jet vane system may be jettisoned by activating pyrotechnic clamp bolt cutters allowing the V-clamp to radially expand and decouple the jet vane control system from the missile. By detachment, missile weight is reduced and plume drag is eliminated thereby giving the missile greater range and terminal velocity.

The skin 77, FIG. 3 of the jet vane control system may have an integrally machined front flange for a V-clamp which slides over the support structure and is fastened to it. The skin and support structure may be fabricated from 2014 aluminum alloy. The exposed inner surfaces may be coated for thermal protection from the rocket plume with an ablative, epoxy filled resin.

The jet vane control system skin configuration allows the four vane shaft bolts to protrude beyond the ten inch outside diameter, yet retain ease of assembly and provide vehicle weight and load transfer from the forward flange to the launcher without straining the gear train assembly 72.

The V-clamp may also be used to apply sufficient pressure at the aft steering control bulkhead joint with the jet vane control system to minimize structural compliance. High bulkhead joint rigidity is necessary to transfer pitch overloads from the jet vane control system to the missile and minimize structural dynamic interference with the steering control feedback system.

The jet vane control system provides an inexpensive disposable mechanism for retrofitting high speed air to air missiles for low speed surface launches. The same concept can be used for AMRAAM missiles for surface launch air defense systems and can be used to enhance ASRAAM, Phoenix, and Standard Missiles for surface launch against fast low flying threats.

The method for steering a missile during launch is quite simple and comprises the steps of placing the housing mounted moveable vanes 46, 48, 50 and 52, FIG. 3, in the aft portion of a missile so that the vanes are located in the path of the plume. The housing is detachably connected to the missile and the vanes are connected to the missile's steering control system whereby this system is able to move the vanes during launch at the same time it moves the missile's tail fins. It is also desirable to use a mechanism such as explosive bolts or a V-clamp to allow detachment of the vanes and the housing after the launch.

In operation, the missile and its attached jet vane control system are in a canister ready to be launched. When a threat is recognized and the missile is launched, the missile's steering control system can operate immediately and effectively by turning the vanes up to plus or minus 25 degrees (and even beyond to plus/minus 33 degrees before adjacent vanes make contact). After a few seconds, the missile will have pitched over and the missile's program will direct the separation of the jet vane control system leaving the missile without the added weight or drag. Thereafter, the missile will seek and destroy its target in the usual manner.

The present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and Accordingly,

What is claimed is:

1. A detachable missile attitude control system for use on a missile having control fins and drive means for actuating said control fins, comprising:

a housing adapted to be attached to the aft portion of a missile;

a plurality of vanes connected to said housing adapted to be positioned in a plume of the missile; and connecting means coupling said vanes to said drive means for actuation of said vanes with actuation of said control fins.

2. The invention of claim 1 wherein said connecting means includes a shaft and a coupling.

3. The invention of claim 1 wherein said connecting means comprises a gear train.

4. The invention of claim 3 wherein said gear train includes an idler gear, a driver gear, a bevel gear and a sector gear.

5. The invention of claim 1 wherein said plurality of vanes comprises four vanes disposed 90 degrees apart.

6. The invention of claim 1 including means connected to said missile and said housing for separating said vane control system from said missile.

7. The invention of claim 1 wherein:

said connecting means includes a shaft, a coupling, and a gear train having an idler gear, a driver gear, a bevel gear and a sector gear;

said plurality of vanes comprises four vanes disposed 90 degrees apart; and means connected to said missile and said housing for separating said vane control system from said missile.

8. A method for steering a missile during launch, the missile having a steering control system, comprising the steps of:

placing movable vanes mounted to a housing in the plume path of a missile;

detachably connecting said housing to the aft portion of said missile; and connecting said vanes to the missile's steering control system whereby the steering control system is able to move the vanes during launch of said missile.

9. The invention of claim 8 wherein said housing connecting step includes using detachable means for separating said housing from said missile after launch.

10. The invention of claim 8 wherein said vanes connecting step includes using a shaft, a coupling and a gear train.

* * * * *